United States Patent
Martin et al.

(10) Patent No.: US 8,297,779 B2
(45) Date of Patent: Oct. 30, 2012

(54) DEVICE FOR POWER SUPPLY OF A PORTABLE ELECTRIC TORCH BY STORAGE BATTERY UNIT OR BATTERIES, AND LAMP EQUIPPED WITH SUCH A DEVICE

(75) Inventors: Grégory Martin, Domène (FR); Frédéric Piu, Pontcharra (FR); Paul Petzl, Barraux (FR)

(73) Assignee: Zedel, Crolles (FR)

( * ) Notice: Subject to any disclaimer, the term of this patent is extended or adjusted under 35 U.S.C. 154(b) by 310 days.

(21) Appl. No.: 12/654,795

(22) Filed: Jan. 4, 2010

(65) Prior Publication Data
US 2010/0177510 A1   Jul. 15, 2010

(30) Foreign Application Priority Data
Jan. 12, 2009   (FR) .................................. 09 00102

(51) Int. Cl.
*F21L 4/00* (2006.01)
(52) U.S. Cl. .................. 362/194; 362/196; 362/199
(58) Field of Classification Search .................. 362/183, 362/190, 191, 194, 196, 199, 208, 396; 429/100
See application file for complete search history.

(56) References Cited

U.S. PATENT DOCUMENTS

| 3,393,312 | A | * | 7/1968 | Dahl | ............................. 362/190 |
| 4,977,042 | A |   | 12/1990 | Chiyajo et al. | |
| 5,600,223 | A |   | 2/1997 | Shirai | |
| 5,707,137 | A | * | 1/1998 | Hon | ............................. 362/208 |
| 6,945,666 | B2 | * | 9/2005 | Woolfson | ...................... 362/183 |
| 7,140,754 | B2 | * | 11/2006 | Thuma et al. | ................. 362/191 |
| 7,850,329 | B2 | * | 12/2010 | Henry et al. | .................. 362/396 |

FOREIGN PATENT DOCUMENTS
EP        0 409 744 A1   1/1991
FR        2 650 123 A1   1/1991

OTHER PUBLICATIONS

French Search Report issued in Application No. 0900102; mailed on Aug. 4, 2009 (with English translation).

* cited by examiner

*Primary Examiner* — Y My Quach Lee
(74) *Attorney, Agent, or Firm* — Oliff & Berridge, PLC (57) ABSTRACT

A device for power supply of a portable electric lighting lamp by batteries or a storage battery unit, said device being composed of a front case housing a system of electric contacts connected to the lighting module, of a rear case in the form of a cover, and of a fixing system comprising first articulation means and first clip-fastening means to assemble the rear case to the front case. A storage battery unit is housed in an insulating enclosure to constitute a single intercalated part able to be inserted between the front case and the rear case, said enclosure comprising second articulation means and second clip-fastening means designed to operate in conjunction with said first means of the fixing system when the storage battery unit is fitted instead of and in place of the batteries.

7 Claims, 10 Drawing Sheets

DEVICE FOR POWER SUPPLY OF A PORTABLE ELECTRIC TORCH BY STORAGE BATTERY UNIT OR BATTERIES, AND LAMP EQUIPPED WITH SUCH A DEVICE

BACKGROUND OF THE INVENTION

The invention relates to a device for power supply of a portable electric lighting lamp by storage battery unit or batteries, said device being composed:
- of a front case housing a system of electric contacts connected to the lighting module,
- of a rear case in the form of a cover,
- and of a fixing system comprising first articulation means and first clip-fastening means to secure the rear case to the front case.

The power supply device can be integrated directly in the enclosure of the lamp or be housed in an external auxiliary module connected to the lamp by an electrical connection.

The lighting module of the lamp can be equipped with at least one light-emitting component, in particular a light-emitting diode LED or a bulb.

STATE OF THE ART

Figure 1:
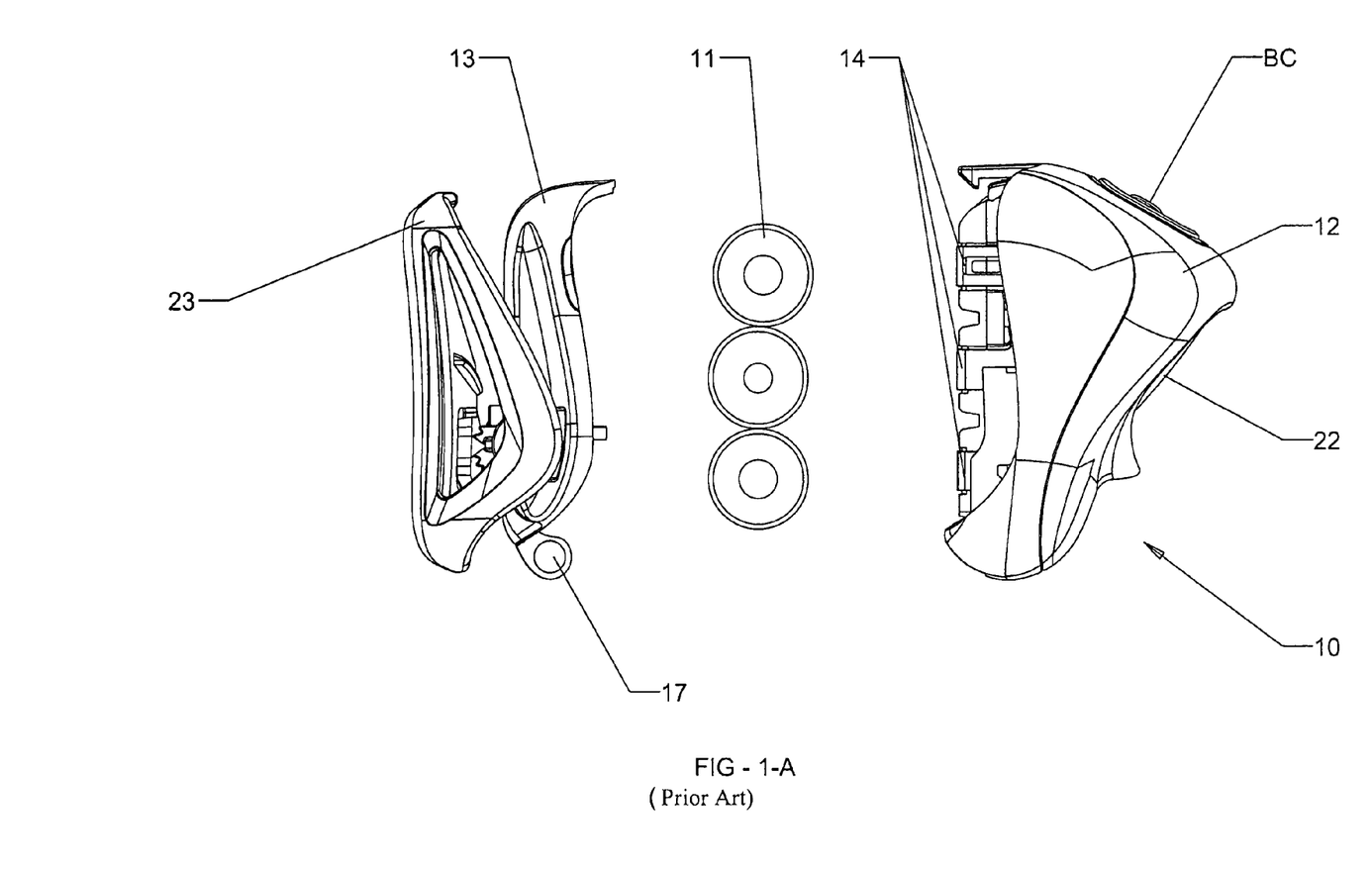
FIG. 1A is an exploded perspective view of a portable electric lamp of the prior art supplied by integrated disposable or rechargeable batteries.
FIG. 1B is a cross-sectional view of FIG. 1A.

FIGS. 1A and 1B show a lighting lamp 10 of the first type with a power supply device integrated with the lighting module 22 which operates with cylindrical batteries 11 placed between contacts 14 in recesses of front case 12 to form a DC power source. Contacts 14 are in direct connection with lighting module 22, and rear case 13 is fitted onto front case 12 to completely close off the compartment housing batteries 11 for the lamp to be operated.

Rear case 13 can also be disassembled to remove used batteries 11 and fit new batteries. For this purpose rear case 13 comprises first articulation means 15 at the bottom part and first clip-fastening means 16 at the top part.

A plate 23 is fitted swivelling on the base of rear case 13 for fixing an elastic strap when the lamp is worn on the front of the head. Plate 23 can be replaced by any other attachment means, in particular a strap or a reel system.

First articulation means 15 of rear case 13 are formed by a transverse spindle formed by a pair of opposite pins 17 designed to be engaged in aligned first holes 26 of front case 12 to allow a relative swivelling movement between the two cases 12, 13.

First clip-fastening means 16 at the top part of rear case 13 comprise a first securing spigot 18 arranged in a notch 19 of the body of case 13. When the two cases 12, 13 are assembled to one another, securing spigot 18 latches, at the end of swivelling travel, on a first flexible latch 27 of front case 12 to form a clip. This closing clip can naturally be released manually by lifting the latch to release first spigot 18 and open rear case 13 by swivelling when replacing batteries 11.

Batteries 11 can be conventional batteries, rechargeable or not, which have to be respectively recharged or replaced at the end of discharging or at the end of life.

Certain lamps house an internal storage battery unit instead of batteries 11. A storage battery unit has a greater autonomy but generally requires a larger housing volume than that used for batteries 11. It can be equipped with a terminal or a socket able to be electrically connected by means of a special connector to an external charger designed to recharge the storage battery unit which remains in place inside the lamp.

The cases of the battery-operated lamps and of the storage battery unit-operated lamps are specific and require two ranges of products thereby increasing the manufacturing cost and making production management and storage more complicated.

The same problem arises for lamps of the second type having an external auxiliary power supply module connected to the lamp by an electrical connection with conducting wires. Two specific power supply cases are necessary depending on whether the lamps use conventional batteries or a storage battery unit.

Another drawback for the user is malfunctioning of the electric power supply device when hiking, as replacing the discharged storage battery unit by conventional new batteries is not possible on the same lamp if this substitution is not scheduled on the lamp case. The same is true for the reverse operation of replacing used or discharged conventional batteries by a charged storage battery unit.

OBJECT OF THE INVENTION

The object of the invention consists in providing a power supply device for a portable electric lamp that is easily adaptable by the user to a power source comprising batteries or a storage battery unit without modifying the parts constituting the case of the lamp.

The power supply device according to the invention is characterized in that the storage battery unit is housed in an insulating enclosure to constitute a single intercalated part able to be inserted between the front case and the rear case, said enclosure comprising second articulation means and second clip-fastening means designed to operate in conjunction with said first means of the fixing system when the storage battery unit is fitted instead of and in place of the batteries.

For a lighting lamp of the first type with a power supply device integrated with the lighting module, the user can thus use:
- either conventional batteries of LR03 type placed in the front case, the rear case being clipped onto the latter by means of a hinge at the bottom and a clip at the top;
- or a storage battery unit fitted instead of and in place of the batteries. The storage battery unit is clipped onto the front case by means of a hinge at the bottom and a clip at the top. The rear case is then clipped onto the opposite face of the storage battery unit by means of a hinge at the bottom and a clip at the top.

According to a preferred embodiment, the second articulation means of the storage battery unit comprise a transverse spindle formed by a pair of second pins able to be inserted in first holes of the front case, and a pair of second holes for insertion of a transverse spindle formed by a pair of first pins of the rear case. The second pins and second holes are arranged side by side in the bottom part of the storage battery unit, said respective first and second holes of the front case and of the storage battery unit being identical to receive either the first pins of the rear case when conventional batteries are used or the second pins of the storage battery unit. The second clip-fastening means of the storage battery unit comprise a second spigot designed to clip at the end of swivelling travel onto a first flexible latch of the front case, and a second flexible latch able to be latched on the first securing spigot of the rear case.

The second spigot and second latch are preferably arranged side by side at the top part of the storage battery unit, being separated from one another by a preset distance corresponding to the distance separating the second pins from the second holes in the bottom part.

The first latch of the front case and the second latch of the storage battery unit present identical structures and operate respectively in conjunction with the second securing spigot of the storage battery unit and with the first securing spigot of the rear case, whereas the latter is clipped directly onto the first flexible latch of the front case when the storage battery unit is replaced by batteries.

The invention is applicable to a portable electric lamp with integrated power supply device, or to a portable lamp connected by an electrical connection to an external auxiliary module housing the power supply device.

BRIEF DESCRIPTION OF THE DRAWINGS

Other advantages and features of the invention will become more clearly apparent from the following description of different embodiments of the invention given for non-restrictive example purposes only and represented in the accompanying drawings in which.

DETAILED DESCRIPTION OF THE INVENTION

With reference to FIGS. 2 to 8, an electric lighting lamp 100, in particular a headlamp, comprises the same front case 12 and the same rear case 13 as those of lamp 10 of FIG. 1B, but individual batteries 11 are replaced by a rechargeable storage battery unit 20. Lamp 100 requires a larger intermediate volume than that of batteries 11, as storage battery unit 20 is housed in an enclosure 21 made from insulating material having larger overall dimensions.

In this lamp 100 of the first type with integrated storage battery unit 20, the same reference numbers will be used to designate identical or similar parts to those of FIG. 1B. Front case 12 with its lighting module 22 and its control button BC, and rear case 13 with its plate 23, are the same as those of lamp 10 with batteries of FIG. 1B without any modification.

Figure 2:
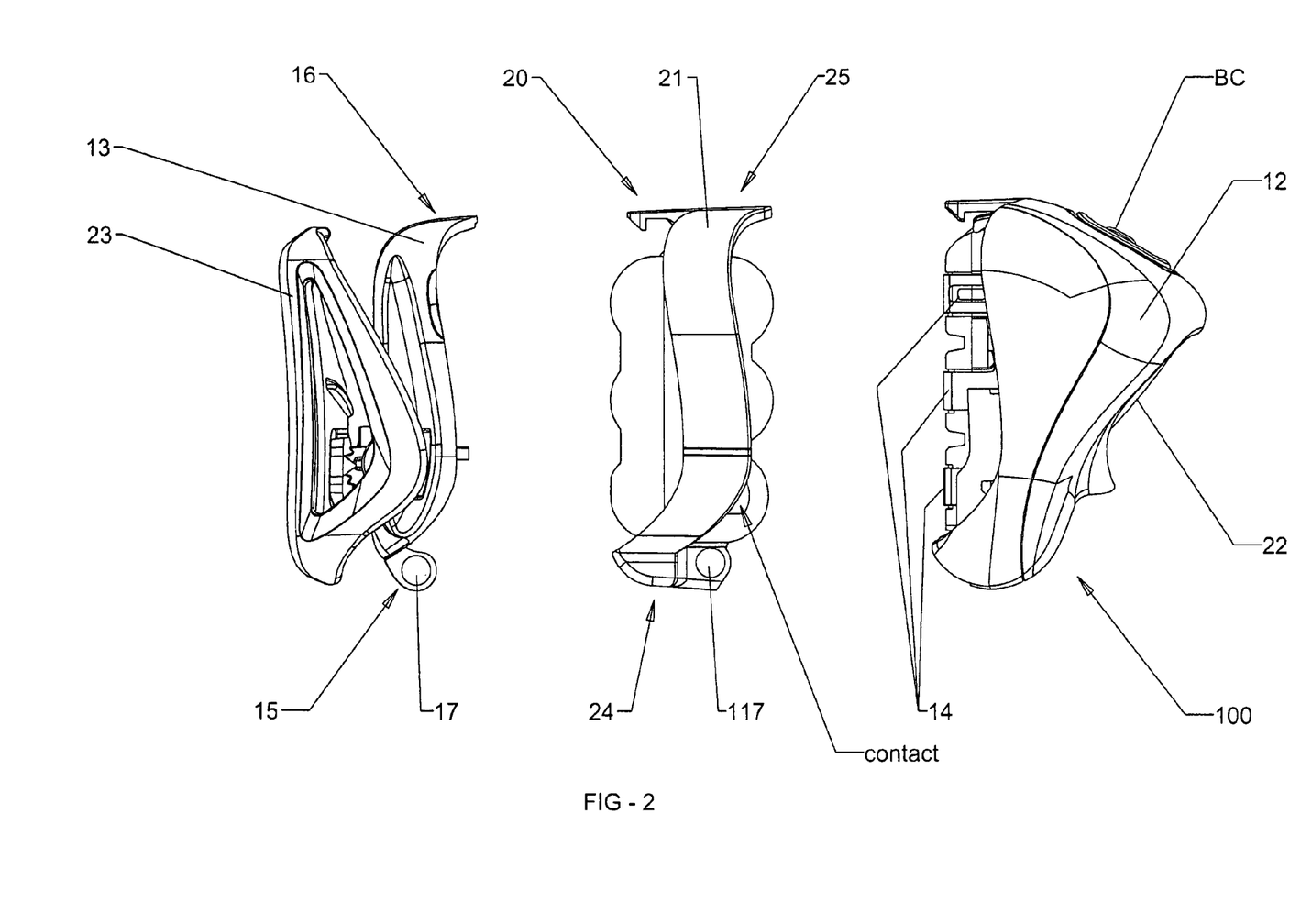
FIG. 2 represents an identical view to FIG. 1 after the batteries have been replaced by a storage battery unit according to the invention.
Figure 3:
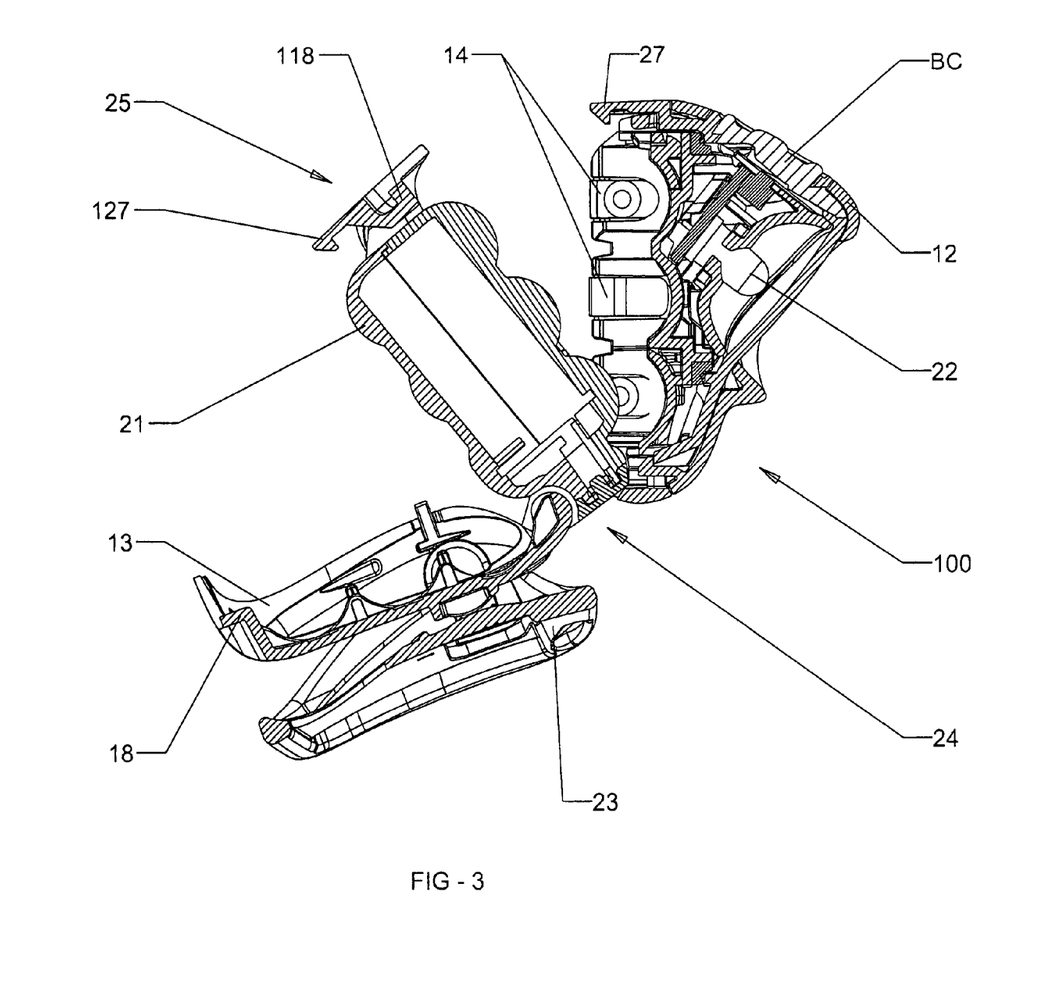
FIGS. 3 to 5 show cross-sectional views of the three assemblies constituting the front case, the storage battery unit, and the rear case of FIG. 2, respectively in the swivelled position after the clips have been released, in the assembled position after clip-fastening, and in the separated position after the hinges have been removed.

Storage battery unit 20 is housed in enclosure 21 made from insulating material to constitute a single monoblock part. Enclosure 21 is equipped at its base with second articulation means 24 and at its top part with second clip-fastening means 25.

Second articulation means 24 of storage battery unit 20 are composed of:
  a transverse spindle (see FIG. 2) formed by a pair of opposite pins 117 designed to be engaged in aligned first holes 26 (see FIG. 5) of front case 12 to allow a relative swivelling movement between front case 12 and storage battery unit 20;
  and a pair of opposite second holes 126 (see FIG. 5) aligned in a parallel direction with respect to pins 117 and offset from the latter by a small distance.

Respective holes 26, 126 of front case 12 and storage battery unit 20 are identical and can receive either first pins 17 of rear case 13 when conventional batteries 11 are used with lamp 10 of FIG. 1B or second pins 117 of storage battery unit 20 in the case of lamp 100 of FIG. 2.

Second clip-fastening means 25 at the top part of storage battery unit 20 comprise:
  a second spigot 118 designed to clip onto first flexible latch 27 of front case 12 at the end of swivelling travel,
  a second flexible latch 127 able to latch onto first securing spigot 18 of rear case 13.

Second spigot 118 and second latch 127 are arranged side by side at the top part of storage battery unit 20, being separated from one another by a preset distance corresponding to that separating second pins 117 from second holes 126 at the bottom part.

First latch 27 of front case 12 and second latch 127 of storage battery unit 20 are identical and operate respectively in conjunction with second securing spigot 118 and with first securing spigot 18 when storage battery unit 20 of lamp 100 of FIG. 2 is used. When used with conventional batteries 11 of FIG. 1B, first securing spigot 18 of rear case 13 is clipped directly onto first flexible latch 27 of front case 12.

Figure 8:
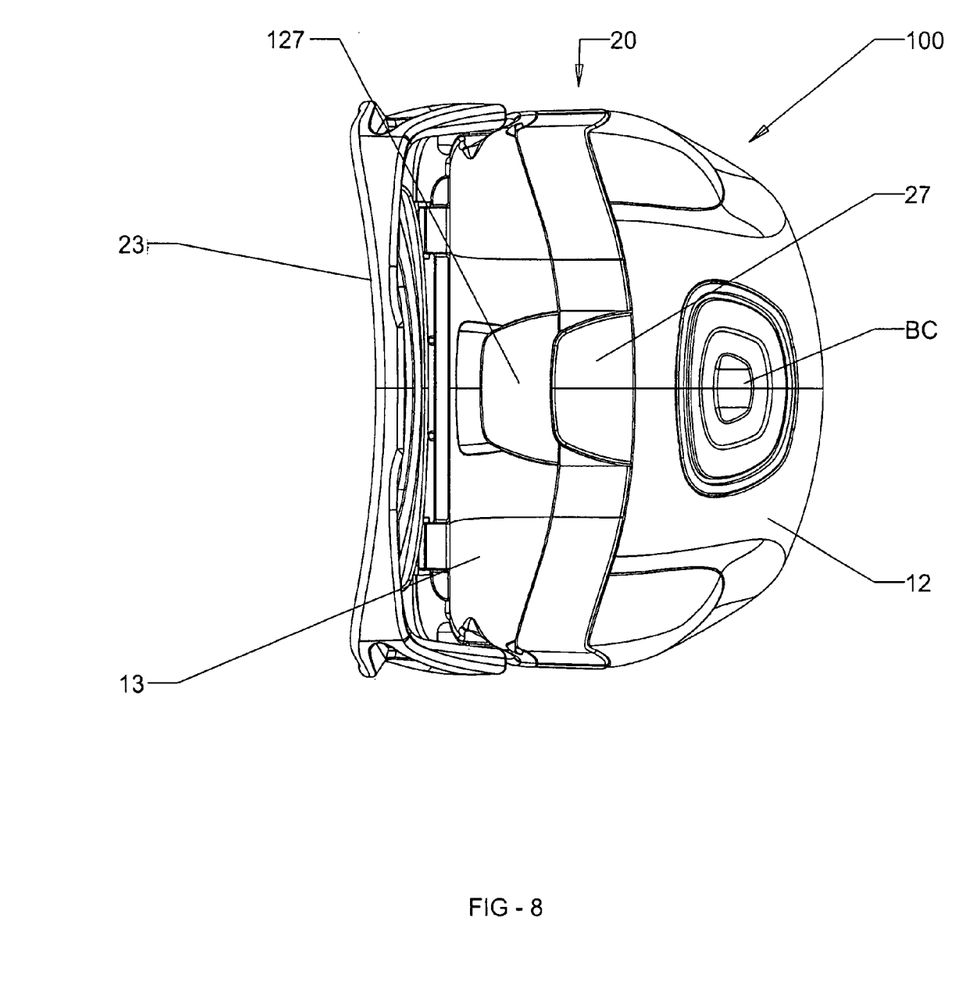
FIG. 8 represents a plane view of the lamp of FIG. 4 in the assembled position.

In FIG. 8, final assembly of lamp 100 with storage battery unit 20 shows the increase of the intermediate volume with respect to that of lamp 10 of FIG. 1B. Front case 12 and rear case 13 remain standard and the user can therefore easily fit a power source with batteries or with a storage battery unit without modifying the parts constituting the case of the lamp.

The presence of storage battery unit 20 provided with the association of second latch 127 and second spigot 118 and the association of second pins 117 and second holes 126 enables the same articulation and clip-fastening means between the two cases 12, 13 to be used.

Figure 4:
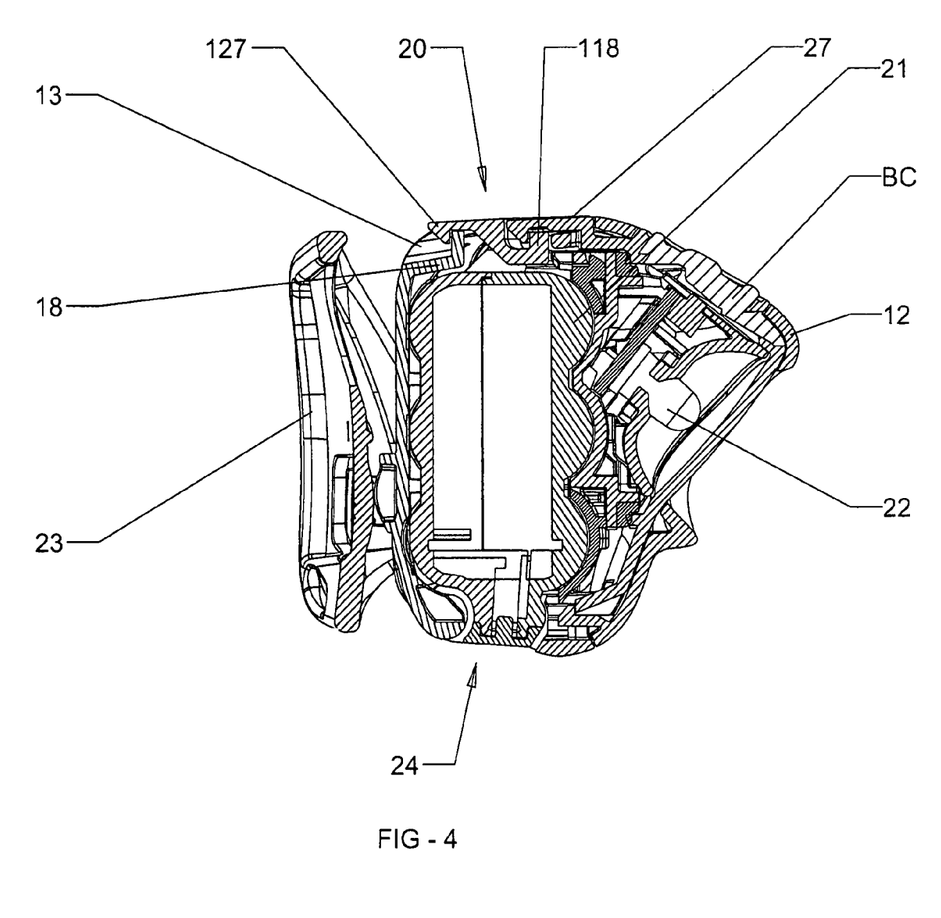
Figure 5:
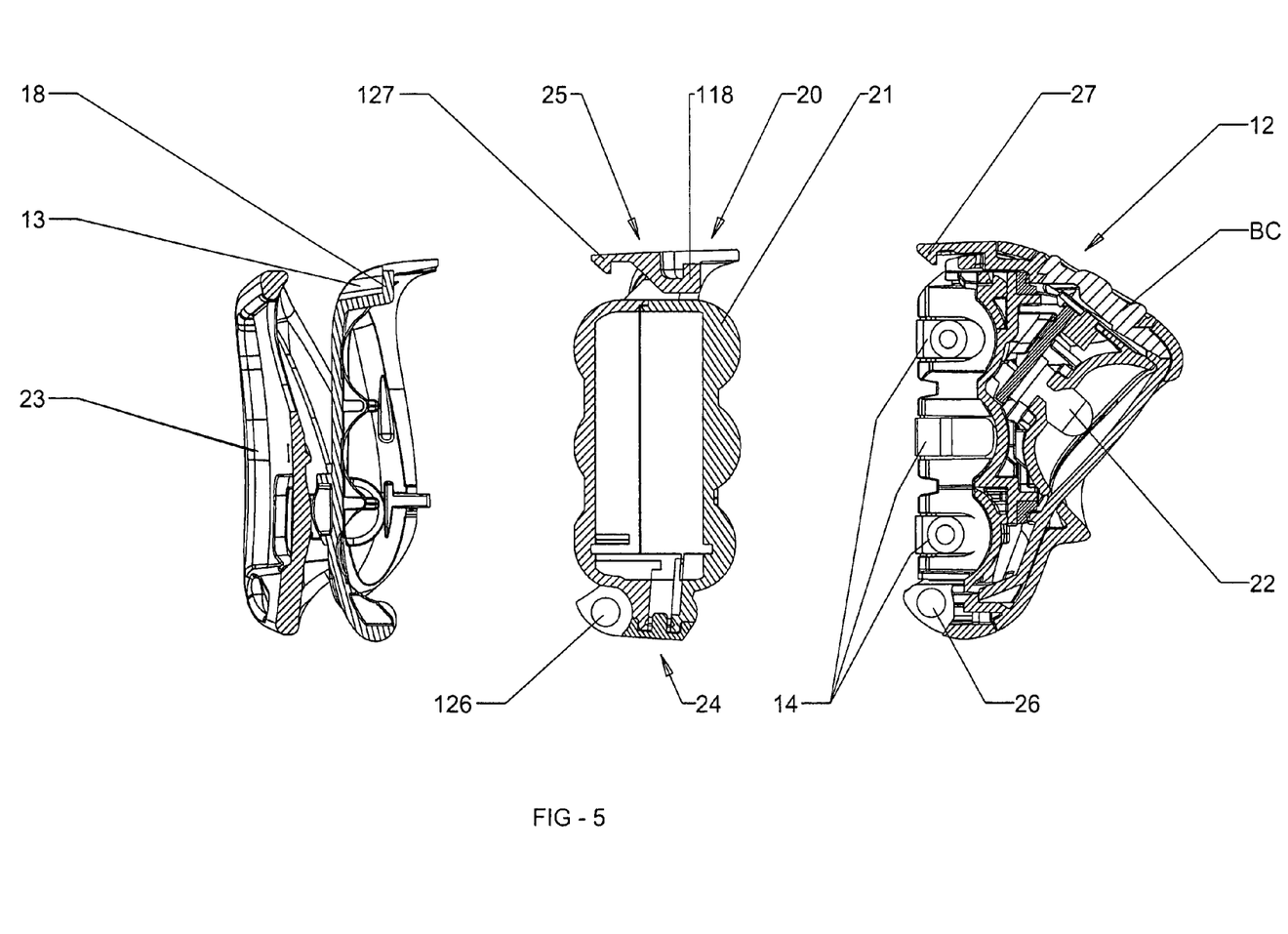
Figure 6:
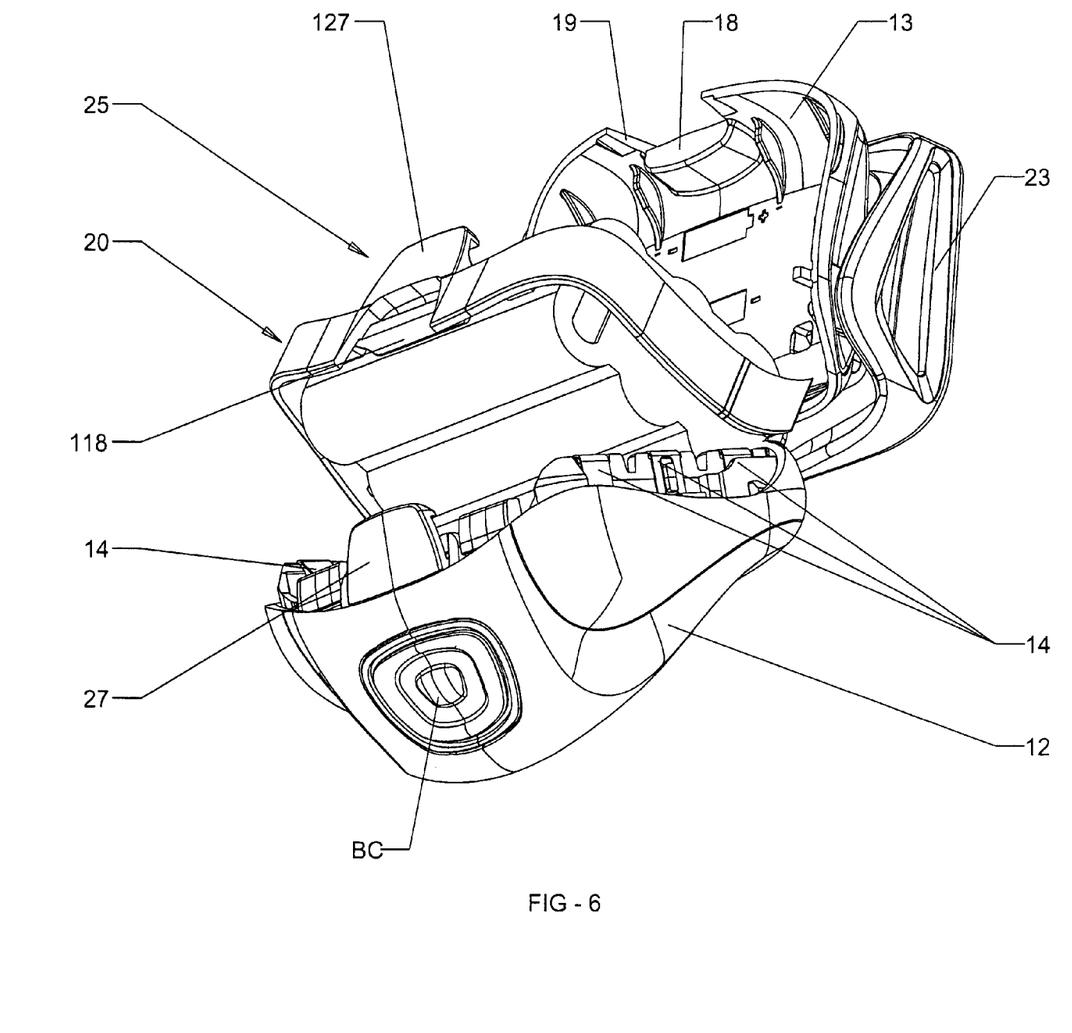
FIGS. 6 and 7 illustrate two other perspective and side views of the half-open lamp according to FIG. 3.
Figure 7:
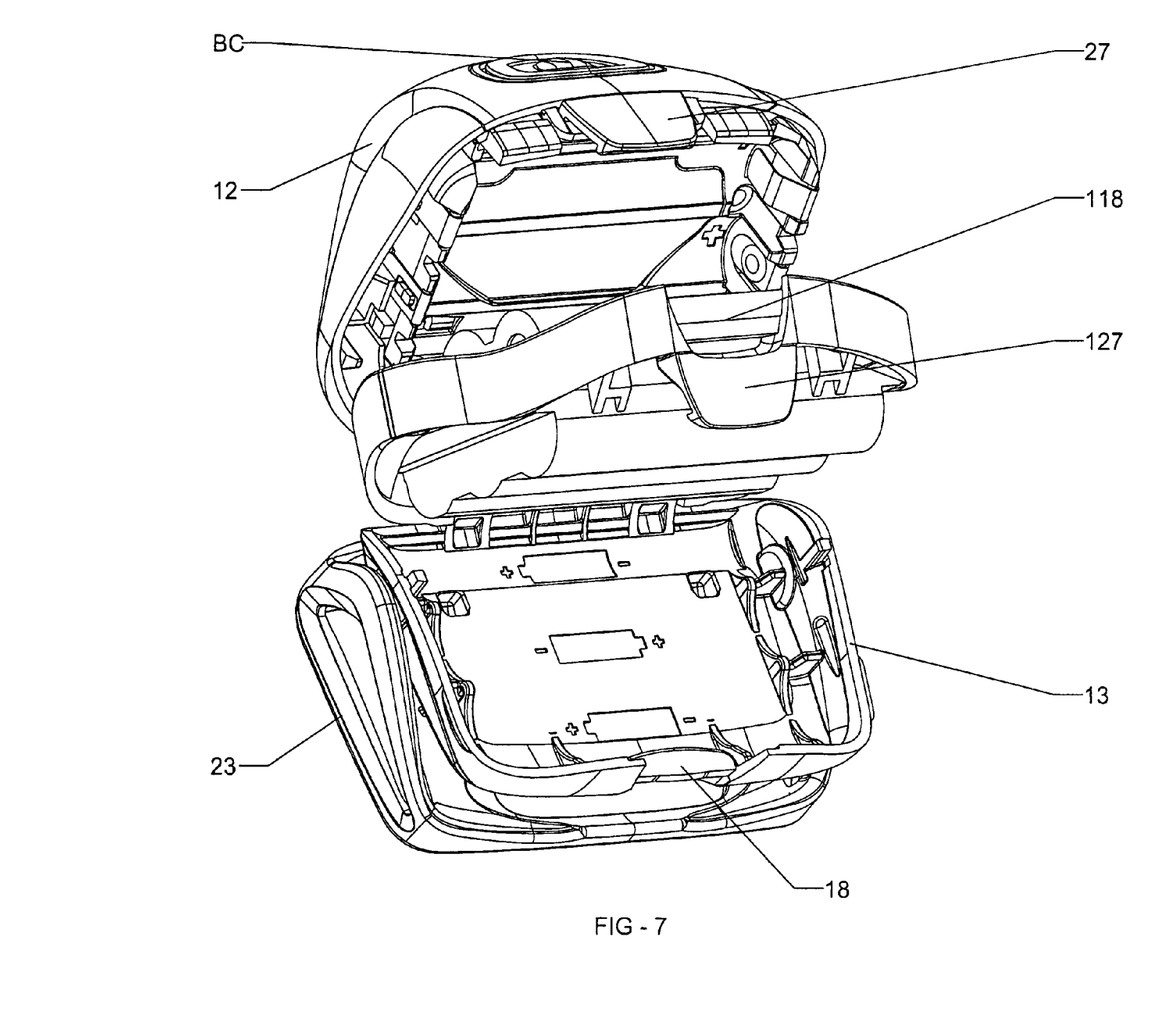

In FIGS. 4 and 8, when storage battery unit 20 of lamp 100 runs out during a hike, the user can easily replace it by conventional batteries 11. He simply has to release first and second latches 27, 127 at the top part to make cases 12, 13 and storage battery unit 20 swivel, and he can then remove pins 17, 117 from corresponding holes 126, 26 at the bottom part to completely separate the three assemblies, as shown in FIG. 2.

New or recharged conventional batteries 11 can then be inserted between contacts 14. The lamp is reclosed by fixing rear case 13 to front case 12 as in FIG. 1B.

Figure 9:
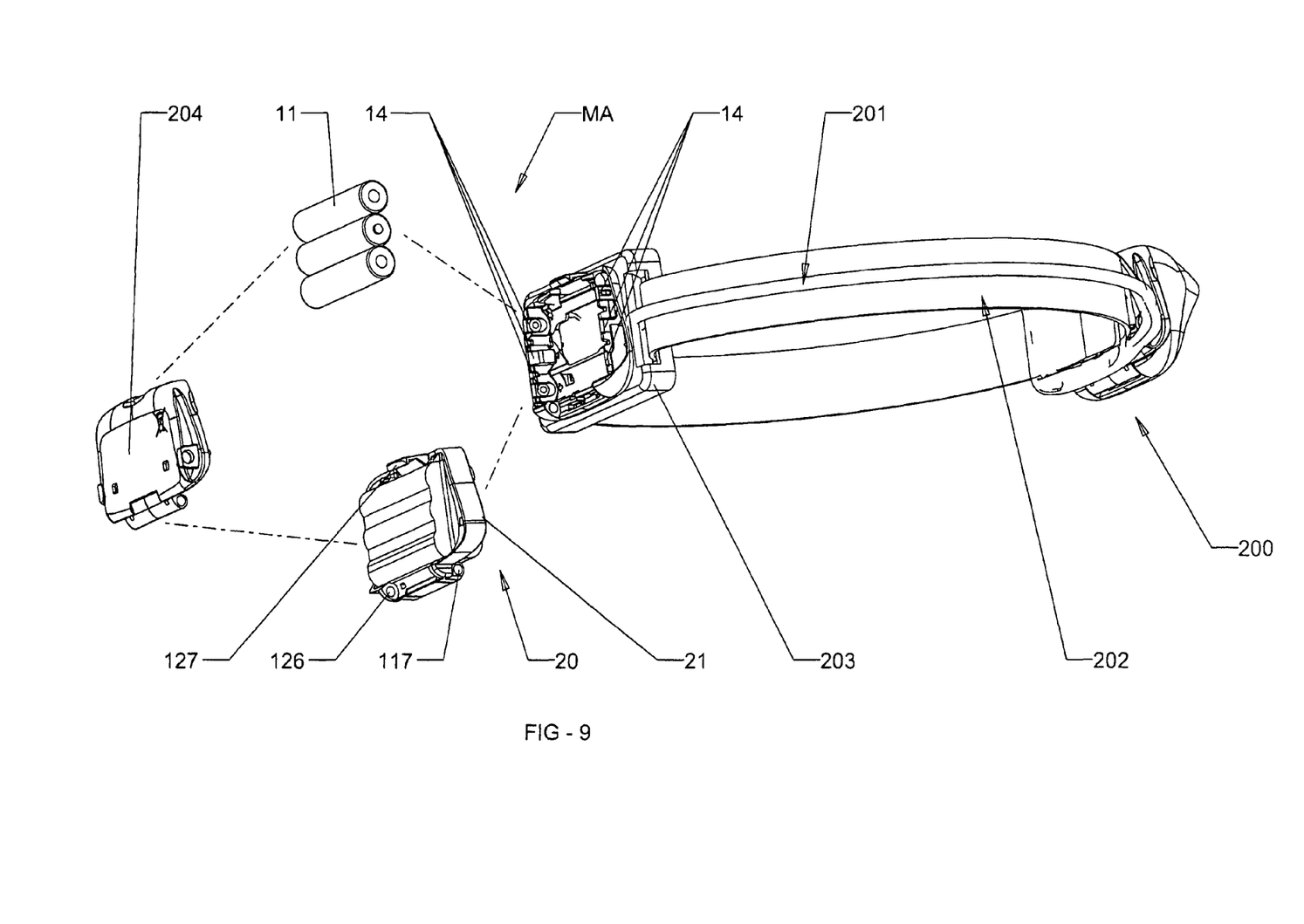
FIG. 9 is a view of the power supply device housed in an external auxiliary module connected to the lamp by an electrical connection.

According to FIG. 9, the same concept is applicable to a lamp 200 of the second type having an external auxiliary power supply module MA connected to the lamp by an electrical connection 201 and an attachment strap 202 or reel system. One of cases 203 of the external auxiliary module is then not provided with lighting components and the other case 204 acting as cover will not be provided with a plate 23. The external auxiliary power supply module can thus be provided with batteries 11 or with a storage battery unit 20 using the same articulation and clip-fastening means between the two cases 203, 204.

The invention claimed is:

1. A device for power supply of a portable electric lighting lamp by batteries or a storage battery unit, said device being composed:
  of a front case housing a system of electric contacts connected to a lighting module,
  of a rear case in the form of a cover, and of a fixing system comprising first articulation means and first clip-fastening means to secure the rear case to the front case, wherein the storage battery unit is housed in an insulating enclosure to constitute a single intercalated part able to be inserted between the front case and the rear case, said enclosure comprising second articulation means and second clip-fastening means designed to operate in conjunction with said first means of the fixing system when the storage battery unit is fitted instead of and in place of the batteries; and wherein said second articulation means of the storage battery unit comprise a transverse spindle formed by a pair of second pins able to be inserted in first holes of the front case, and a pair of second holes for insertion of a transverse spindle formed by a pair of first pins of the rear case.

2. The device for power supply by batteries or a storage battery unit according to claim 1, wherein the second pins and the second holes are arranged side by side at a bottom part of the storage battery unit, said respective first and second holes of the front case and of the storage battery unit being identical to receive either first pins of the rear case when conventional batteries are used, or the second pins of the storage battery unit.

3. The device for power supply by batteries or a storage battery unit according to claim 1, wherein the second clip-fastening means of the storage battery unit comprise a second securing spigot designed to be clipped onto a first flexible latch of the front case at an end of swivelling travel, and a second flexible latch of the battery unit able to be latched on a first securing spigot of the rear case.

4. The device for power supply by batteries or a storage battery unit according to claim 3, wherein the second securing spigot and the second flexible latch are arranged side by side at a top part of the storage battery unit, being separated from one another by a preset distance corresponding to a distance separating the second pins from the second holes in a bottom part.

5. The device for power supply by batteries or a storage battery unit according to claim 4, wherein the first latch of the front case and the second latch of the storage battery unit are identical and operate respectively in conjunction with the second securing spigot of the storage battery unit and with the first securing spigot of the rear case, whereas the latter is clipped directly onto the first flexible latch of the front case when the storage battery units replaced by batteries.

6. A portable electric lamp with an integrated power supply device according to claim 1.

7. A portable electric lamp connected by an electrical connection to an external auxiliary module housing a power supply device according to claim 1.

* * * * *